(12) United States Patent
Jojic et al.

(10) Patent No.: US 7,702,489 B2
(45) Date of Patent: Apr. 20, 2010

(54) METHOD AND APPARATUS FOR FAST MACHINE LEARNING USING PROBABILITY MAPS AND FOURIER TRANSFORMS

(75) Inventors: Nebojsa Jojic, Redmond, WA (US); Brendan J. Frey, Mississauga (CA)

(73) Assignee: Microsoft Corporation, Redmond, WA (US)

( * ) Notice: Subject to any disclaimer, the term of this patent is extended or adjusted under 35 U.S.C. 154(b) by 1675 days.

(21) Appl. No.: 10/286,142

(22) Filed: Nov. 1, 2002

(65) Prior Publication Data

US 2004/0088272 A1 May 6, 2004

(51) Int. Cl.
G06F 7/60 (2006.01)
G06F 17/10 (2006.01)

(52) U.S. Cl. .......................................... 703/2; 706/13
(58) Field of Classification Search ................. 706/13; 703/2
See application file for complete search history.

(56) References Cited

OTHER PUBLICATIONS

Vaseghi et al. "Noise Compensation Methods for Hidden Markov Model Speech Recognition in Adverse Environments".*
"Large Vocabulary Continuous Speech Recognition" Riederer. 2000.*
Fielding et al. "Spatio-Temporal Pattern Recognition Using Hidden Markov Models." 1995 IEEE.*
Frey, B.J. and Jojic, N., "Transformation Invariant Clustering and Dimensionality Reduction," IEEE Transactions on Pattern Analysis and Machine Intelligence, (2001).
Hinton, G.E. et al., "Modeling the Manifolds of Images of Handwritten Digits," IEEE Transactions on Pattern Analysis and Machine Intelligence, 8:65-74 (1997).
Jojic, N. et al., "Transformed Hidden Markov Models: Estimating Mixture Models of Images and Inferring Spatial Transformations in Video Sequences," In Proceedings of the IEEE Conference on Computer Vision and Pattern Recognition, (2000).
LeCun, Y. et al., "Gradient-Based Learning Applied to Document Recognition," Proceedings of the IEEE, 86(11):2278-2324 (1998).
Wolberg, G. and Zokai, S., "Robust Image Registration Using Log-Polar Transform," In Proceedings IEEE International Conference on Image Processing (2000).
Fisher, Fourier Transform, http://homepages.inf.ed.ac.uk/rbf/HIPR2/fourier.htm, 2003.
Fourier Transform, http://ase.tufts.edu/chemistry/sykes/group%20meetins/Meeting11/Fourier%20Transform2.ppt.

* cited by examiner

Primary Examiner—Kamini S Shah
Assistant Examiner—Saif A Alhija
(74) Attorney, Agent, or Firm—Theodore M. Magee; Westman, Champlin, & Kelly, P.A.

(57) ABSTRACT

The present invention provides a method of constructing recognition models. Under the method, a set of probabilities is estimated for values of a hidden variable. A Fourier transform is determined for the set of probabilities and is used to determine a Fourier transform of an estimated prototype pattern. The inverse Fourier transform is then determined for the Fourier transform of the estimated prototype pattern to form an estimated prototype pattern.

11 Claims, 6 Drawing Sheets

METHOD AND APPARATUS FOR FAST MACHINE LEARNING USING PROBABILITY MAPS AND FOURIER TRANSFORMS

BACKGROUND OF THE INVENTION

The present invention relates to machine learning. In particular, the present invention relates to reducing computation times associated with probabilistic functions used in machine learning.

When performing automated recognition tasks, such as speech recognition or image recognition, it is common to compare an input signal to a probabilistic model to identify a most likely phone or image given the input. One factor that can complicate this comparison is that the data in the input signal may represent a phone or an image that has gone through some type of transformation such as a translation in which the data is shifted either temporally or spatially. For example, for speech signals, the pitch of the phone may be different than the pitch of the phones used in the models. For image signals, the image of interest may be shifted relative to the images used to train the models.

To overcome this problem, the art has developed transformation invariant models that treat the transformation as a hidden variable during construction of the models. Under such systems, a model must be built for both the transformations and the phone or image at the same time. This is typically done using an Expectation-Maximization algorithm in which the parameters of the transformation model are estimated during the Expectation step and then are used to estimate the phone or image model during the Maximization step. The phone or image model is then used to re-estimate the transformation model. This iteration continues until the two models reach some stable point.

While this technique can be used to build small transformation invariant models, it cannot be used for larger models because the calculations become intractable. For example, to estimate an image model for a display having 10,000 pixels, $10^8$ scalar calculations must be performed for each training image that will be used to create the image model.

Thus, a technique is needed for training transformation invariant models without requiring as many calculations as found in the current state of the art.

SUMMARY OF THE INVENTION

The present invention provides a method of constructing recognition models. Under the method, a set of probabilities is estimated for values of a hidden variable. A Fourier transform is determined for the set of probabilities and is used to determine a Fourier transform of an estimated prototype pattern. The inverse Fourier transform is then determined for the Fourier transform of the estimated prototype pattern to form an estimated prototype pattern.

DETAILED DESCRIPTION OF ILLUSTRATIVE EMBODIMENTS

Figure 1:
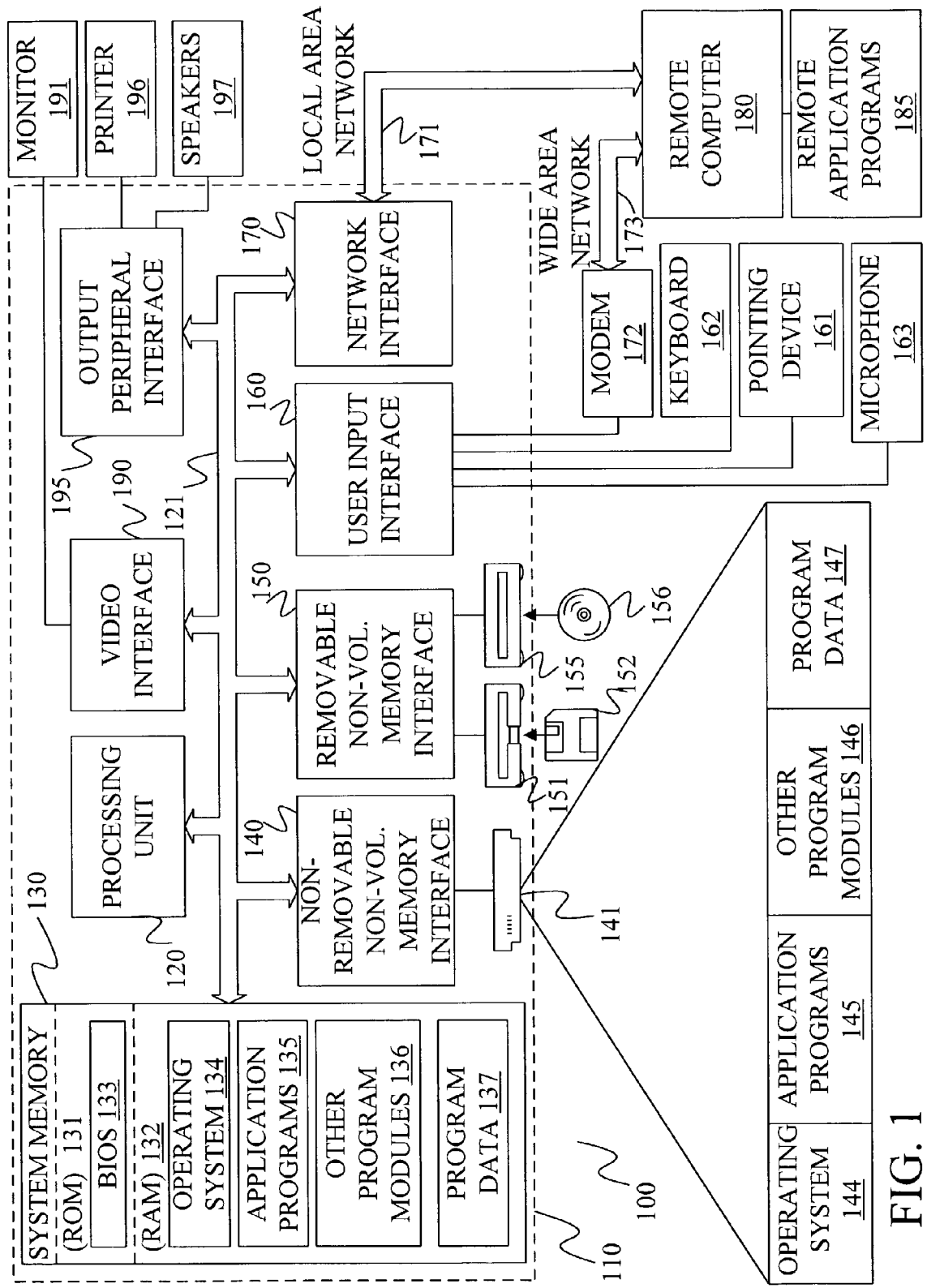
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
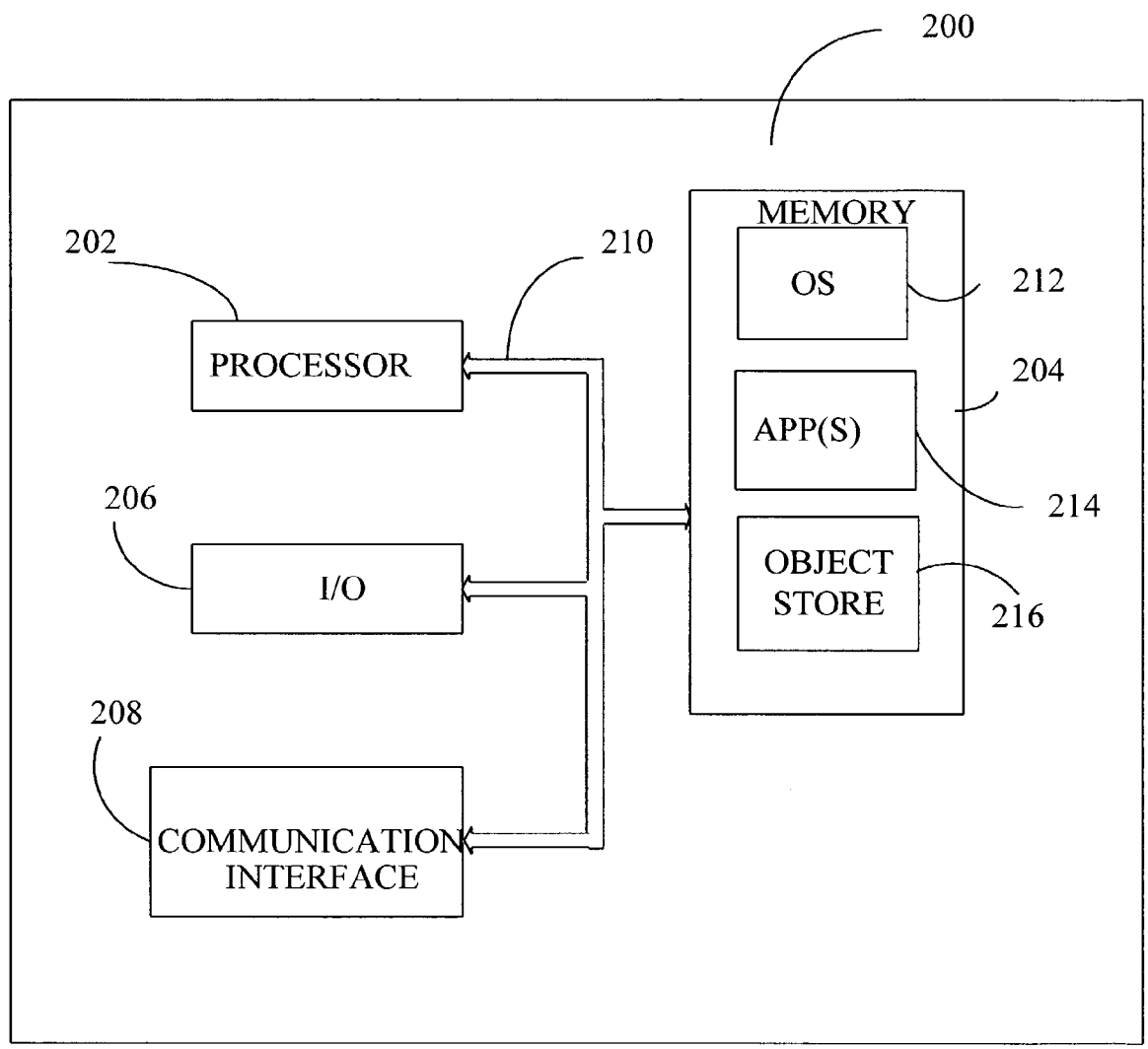
FIG. 2 is a block diagram of a mobile device in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
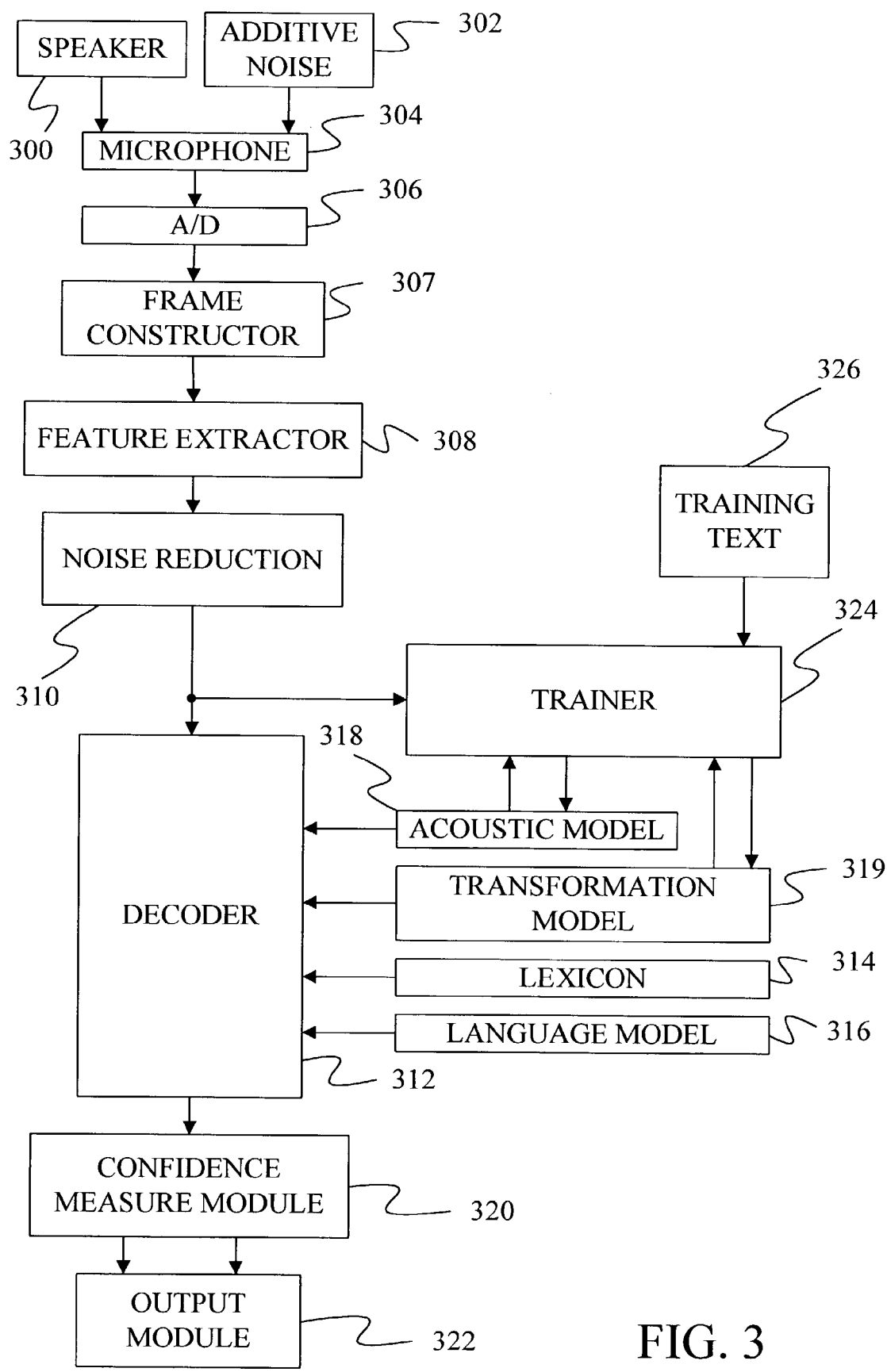
FIG. 3 is a block diagram of a speech recognition system in which the present invention may be practiced.
Figure 4:
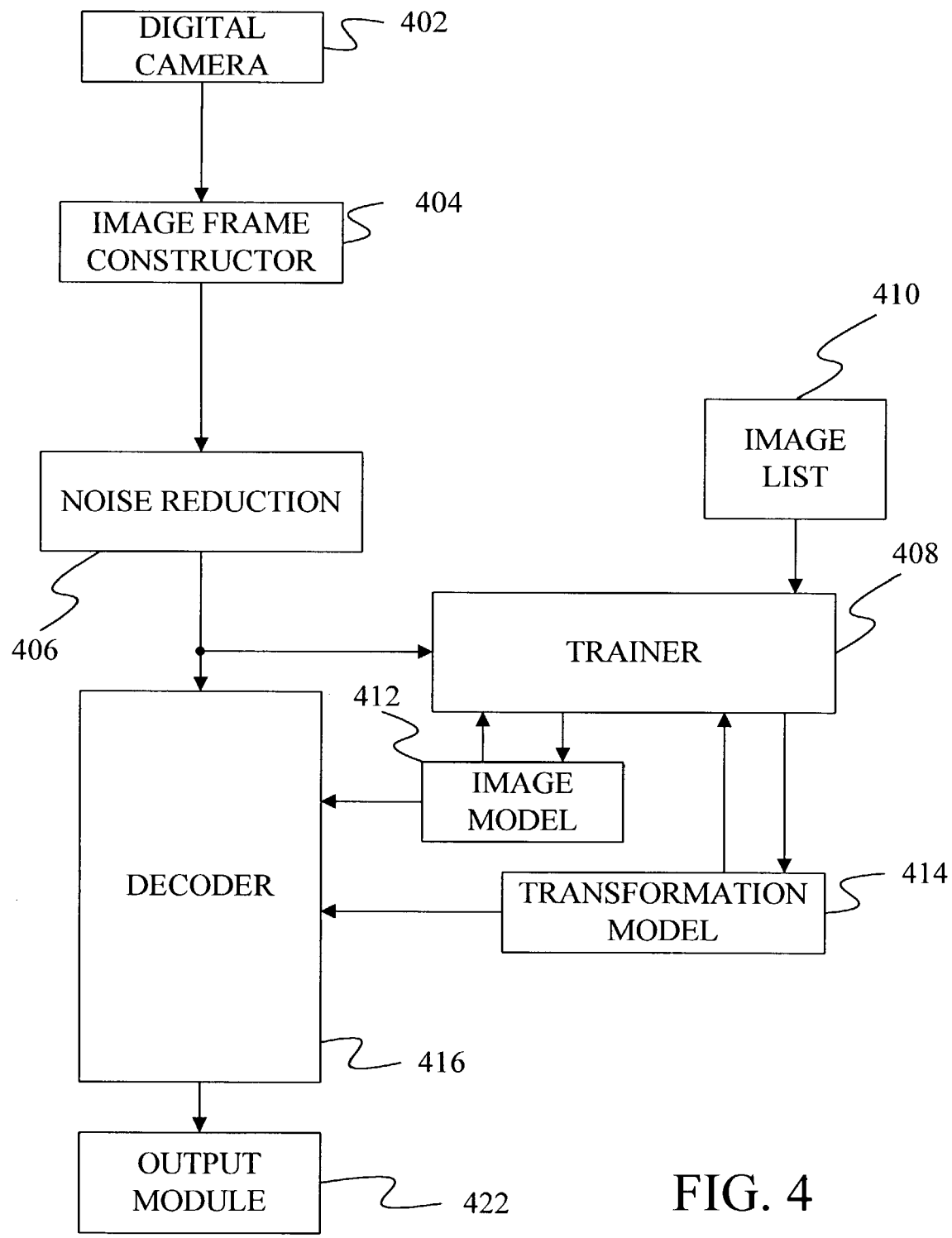
FIG. 4 is a block diagram of an image recognition system in which the present invention may be practiced.

The present invention provides a method for reducing the number of computations associated with using inference and learning to build a transformation-invariant model. For example the invention can be used to form transformation-invariant speech models or image models. FIGS. 3 and 4 provide block diagrams of respective speech and image recognition systems in which embodiments of the present invention may be practiced.

In FIG. 3, a speaker 300, either a trainer or a user, speaks into a microphone 304. Microphone 304 also receives additive noise from one or more noise sources 302. The audio signals detected by microphone 304 are converted into electrical signals that are provided to analog-to-digital converter 306.

A-to-D converter 306 converts the analog signal from microphone 304 into a series of digital values. In several embodiments, A-to-D converter 306 samples the analog signal at 16 kHz and 16 bits per sample, thereby creating 32 kilobytes of speech data per second. These digital values are provided to a frame constructor 307, which, in one embodiment, groups the values into 25 millisecond frames that start 10 milliseconds apart.

The frames of data created by frame constructor 307 are provided to feature extractor 308, which extracts a feature from each frame. Examples of feature extractors are well known in the art.

The feature extraction module produces a stream of feature vectors that are each associated with a frame of the speech signal. This stream of feature vectors is provided to noise reduction module 310, which reduces the noise in the input speech signal. Those skilled in the art will recognize that noise reduction module 310 is not needed to practice the present invention.

The output of noise reduction module 310 is a series of "clean" feature vectors. If the input signal is a training signal, this series of "clean" feature vectors is provided to a trainer 324, which uses the "clean" feature vectors and a training text 326 to train an acoustic model 318 and a transformation model 319 using techniques of the present invention described further below. Acoustic model 318 models the feature vectors that will be produced for the various phonetic units found in a language. Acoustic model 318 can include models for classes of each phone such that each phone is modeled as a mixture of Guassian models. Transformation model 319 models the likelihood of possible transformations of a speech signal such as changes in the pitch of the speech signal.

If the input signal is a test signal, the "clean" feature vectors are provided to a decoder 312, which identifies a most likely sequence of words based on the stream of feature vectors, a lexicon 314, a language model 316, acoustic model 318, and transformation model 319.

The most probable sequence of hypothesis words is provided to a confidence measure module 320. Confidence measure module 320 identifies which words are most likely to have been improperly identified by the speech recognizer, based in part on a secondary acoustic model (not shown). Confidence measure module 320 then provides the sequence of hypothesis words to an output module 322 along with identifiers indicating which words may have been improperly identified.

FIG. 4 provides a block diagram of an image recognition system in which the present invention may be practiced. In FIG. 4, image data is captured by a digital camera 402 and grouped into individual image frames by an image frame constructor 404. Under one embodiment, each image frame consists of set of pixel vectors, where each vector represents a single pixel in the image and provides the intensity of one or more colors captured by digital camera 402 for that pixel.

The image frames are provided to noise reduction module 406, which removes noise present in the image data. Those skilled in the art will recognize that noise reduction module 406 is not necessary for practicing the invention. During training, the resulting image frames from noise reduction module 406 are provided to a trainer 408, which uses the image frames and a corresponding image list 410 to construct an image model 412 and a transformation model 414 for images found in the image list. Image model 412 provides a mean or prototype of a model image and, in some cases, a probability distribution that describes the likelihood of an image frame containing the prototype image. Transformation model 414 provides probabilities that an image frame includes a particular translation.

During recognition, the image frames from noise reduction module 406 are provided to a decoder 416, which uses image model 412 and transformation model 414 to identify a most likely image represented by the image data. This image or its index (image class) is then provided to an output module 422.

Figure 5:
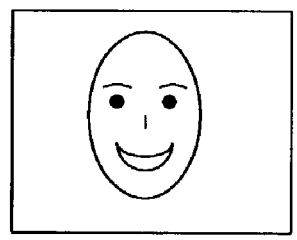
FIG. 5 is an example of a prototype image.
Figure 6:
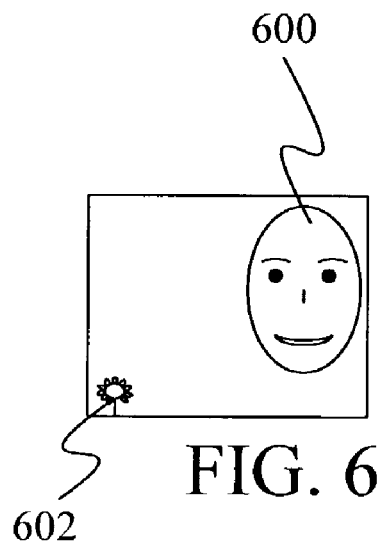
FIG. 6 is an example of a training image with the image translated to the upper right corner.
Figure 7:
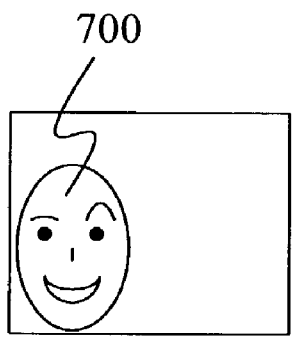
FIG. 7 is an example of a training image with the image translated to the lower left corner.
Figure 8:
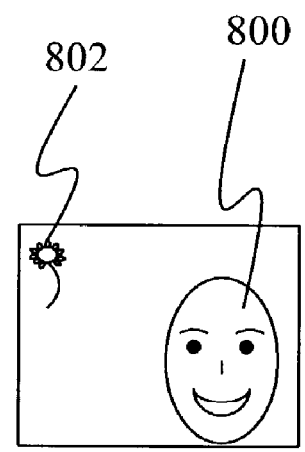
FIG. 8 is an example of a training image with the image translated to the lower right corner.

The challenge of forming a transformation-invariant model can be seen in FIGS. 5, 6, 7, and 8. FIG. 5 represents a prototype or model of a particular image (in this case a face). This prototype is not known when training begins. During training, the image frames of FIGS. 6, 7, and 8 are received. Each image frame includes an instance of the image but the instance in each frame is typically different than the instance in the other frames. For example, in FIG. 6, the smile on the face is slightly different and in FIG. 7, the left eyebrow is different. In addition, the image can be translated in each frame such that it appears in a different location within the frame. Thus, in FIG. 6, the image is in the upper right corner of the image, in FIG. 7 it is in the lower left corner, and in FIG. 8 it is in the lower right corner. Thus, in each instance of the image, the image is shifted by some amount due to an unknown translation.

The goal of using inference and learning to form a transformation-invariant model is to create a model for the prototype and for the translations without knowing the prototype, the variability in the prototype, or translations in training images before training begins. Under the present invention, this is done using an Expectation-Maximization (EM) algorithm, which iteratively estimates a model for the translations and then uses the translation model to estimate the prototype model.

Under one embodiment, the possible translations are represented by a variable T, and forming a model for each possible value of the translation involves determining a probability of each value of T given a frame of image data. In terms of an equation:

$$p(T|f) \propto \frac{\exp\left(\sum_x \frac{(f(x) - g(x+T))^2}{2\sigma(x+T)^2}\right)}{\sum_T \exp\left(\sum_x \frac{(f(x) - g(x+T))^2}{2\sigma(x+T)^2}\right)} \quad \text{EQ. 1}$$

where p(T|f) is the normalized probability of a value of translation T given a collection of pixels within a single frame f, x is a 2-coordinate vector (for example representing x,y in Cartesian coordinates or r, θ in polar coordinates) representing the location of a pixel in an image, T is a 2-coordinate vector (for example representing x-translation, y-translation in Cartesian coordinates or r-translation, θ-translation in polar coordinates) representing the translation of a pixel in an image, f(x) is the value of a pixel vector at point x in a training frame f, g(x+T) is the value of a pixel vector at a point x+T in the estimate of the prototype image, and σ(x+T) is a noise weight that can be used to weight different portions of the image frame differently so as to reduce the effects of image data outside of a core image of interest. For example, the noise weight can be used to emphasize data relating to core images 600, 700, and 800, which represent a face in the image frames of FIGS. 6, 7 and 8 while reducing the effects of flowers 602 and 802.

In Equation 1, the numerator provides a probability of a value of a translation given the frame. The denominator provides a normalization value that is equal to the sum of the probabilities for all of the possible translation values for the frame. This ensures that the sum of all of the normalized probabilities is equal to one.

The summations over x calculated in Equation 1, which represent correlations between the translated prototype image and the observed image, must be calculated for each possible translation value T. Since a translation shifts a pixel from on location to another, there are as many possible translation values as there are pixels on the display. Thus, if there are 76,800 pixels in an image, the calculation within the summation must be performed 76,800 times for a single summation and 76,800 summations must be performed to produce a probability for each translation value. Thus, 5.9 billion (76,800 times 76,800) scalar calculations must be performed in order to identify a probability for each translation value given an image frame.

Under the present invention, the number of calculations that must be performed is reduced by relying on a Fast Fourier Transform (FFT). In particular, the squared difference in the correlation is expanded and the result is divided into three summations such that:

$$\sum_x \frac{(f(x) - g(x+T))^2}{2\sigma(x+T)^2} = \frac{1}{2}\sum_x f(x)^2 \sigma(x+T)^{-2} - \quad \text{EQ. 2}$$

-continued
$$\frac{1}{2}\sum_x 2f(x)g(x+T)\sigma(x+T)^{-2} + $$

$$\frac{1}{2}\sum_x g(x+T)^2 \sigma(x+T)^{-2}$$

The Fast Fourier Transform of each summation is then taken such that:

$$K(\omega) = \frac{1}{2}\sum_T \sum_x f(x)^2 \sigma(x+T)^{-2} e^{-i\alpha\omega T} \quad \text{EQ. 3}$$

$$L(\omega) = \frac{1}{2}\sum_T \sum_x 2f(x)g(x+T)\sigma(x+T)^{-2} e^{-i\alpha\omega T} \quad \text{EQ. 4}$$

$$M(\omega) = \frac{1}{2}\sum_T \sum_x g(x+T)^2 \sigma(x+T)^{-2} e^{-i\alpha\omega T} \quad \text{EQ. 5}$$

Because all possible translation values are being tested, the summation over T is the same as a summation over x+T. As such, the summation can be changed to x+T and the value $e^{i\alpha\omega(x-x)}$, which is equal to one and is added to introduce x in the exponent term, can be placed in each summation without changing the values of the summation. This produces:

$$K(\omega) = \frac{1}{2}\sum_{x+T} \sum_x f(x)^2 \sigma(x+T)^{-2} e^{-i\alpha\omega T} e^{i\alpha\omega(x-x)} \quad \text{EQ. 6}$$

$$L(\omega) = \frac{1}{2}\sum_{x+T} \sum_x 2f(x)g(x+T)\sigma(x+T)^{-2} e^{-i\alpha\omega T} e^{i\alpha\omega(x-x)} \quad \text{EQ. 7}$$

$$M(\omega) = \frac{1}{2}\sum_{x+T} \sum_x g(x+T)^2 \sigma(x+T)^{-2} e^{-i\alpha\omega T} e^{i\alpha\omega(x-x)} \quad \text{EQ. 8}$$

Substituting u for x+T, where u now represents all possible translations, and separating the summation into the product of two sums produces:

$$K(\omega) = \frac{1}{2}\sum_u \sigma(u)^{-2} e^{-i\alpha\omega u} \cdot \sum_x f(x)^2 e^{i\alpha\omega x} \quad \text{EQ. 9}$$

$$L(\omega) = \frac{1}{2}\sum_u g(u)\sigma(u)^{-2} e^{-i\alpha\omega u} \cdot \sum_x 2f(x) e^{i\alpha\omega x} \quad \text{EQ. 10}$$

$$M(\omega) = \frac{1}{2}\sum_u g(u)^2 \sigma(u)^{-2} e^{-i\alpha\omega u} \cdot \sum_x e^{i\alpha\omega x} \quad \text{EQ. 11}$$

Thus, each FFT is formed by determining one FFT in terms of u and multiplying that by the conjugate of an FFT in terms of x. After the FFT's are calculated using Equations 9, 10, and 11, they are summed together and the inverse FFT of the sum is determined. The inverse FFT is then used as the exponent in Equation 1.

Note that Equations 9, 10, and 11 require many fewer calculations than Equation 1. In particular, for an image grid of N-by-N pixels, Equation 1 in its original form would require $N^4$ calculations. However, the number of calculations for Equations 9, 10 and 11 is on the order of $N^2 \log N$. For example, Equation 9 is evaluated by first computing Fourier transforms of image-size matrices $\sigma(u)^2$ and $f(x)^2$, which takes $N^2 \log N$ time using the FFT algorithm, and then performing the point-wise multiply of the first transform and the conjugate of the second. The computation cost of the multiplications is of the order $N^2$.

The calculations of Equations 1, 9, 10 and 11 are repeated for each frame of training images to produce a probability for each translation value given each frame. These probabilities are then used in a Maximization step to re-estimate the prototype image, $g(x)$. By maximizing a goodness function, the following update equation is found for the prototype image:

$$g(x) = \frac{1}{J} \sum_j \sum_T p(T|f_j) f_j(x-T) \qquad \text{EQ. 12}$$

where J is the total number of image frames in the training data, $p(T|f_j)$ is a weighting value that indicates the probability of translation value T given a frame $f_j$, and $f_j(x-T)$ is the estimate of a prototype image pixel provided by frame $f_j$ using translation value T.

Thus, the prototype image is a weighted average of the images in training frames passed through each possible translation value. In some embodiments, the prototype image is considered the mean of the image model. Note that in Equation 12, T is a hidden variable in that it is not directly observable from the training data.

Before the present invention, the calculation of Equation 12 was intractable for large image sizes. As discussed above, for an image having 320×240 pixels, the calculation of equation 12 would require 5.9 billion calculations for each frame of training data.

The present invention overcomes this problem by treating $p(T|f_j)$ as a probability map and utilizing an FFT to perform the calculation of Equation 12. In particular, the inner summation of Equation 12 can be viewed as a partial update to the prototype image and can be defined as:

$$\hat{g}_j(x) = \sum_T p(T|f_j) f_j(x-T) \qquad \text{EQ. 13}$$

where $\hat{g}_j(x)$ is the partial update for the prototype image based on the jth frame of training data.

The present invention recognizes that $p(T|f_j)$ is simply a function of T and not x. Based on this recognition, the present inventors have further recognized that a Fast Fourier Transform could be used to reduce the number of calculations associated with Equation 13. Thus, taking the Fast Fourier Transform, Equation 13 becomes:

$$\hat{G}_j(\omega) = \sum_x \sum_T p(T|f_j) f_j(x-T) e^{-i\alpha\omega x} \qquad \text{EQ. 14}$$

Using the same techniques shown above, Equation 14 can then be divided into the product of two sums, producing:

$$\hat{G}_j(\omega) = \sum_x f_j(u) e^{-i\alpha\omega u} \cdot \sum_T p(T|f_j) e^{-i\alpha\omega T} \qquad \text{EQ. 15}$$

where u has been used in place of x–T and represents a pixel location in the image such that the summation over u is over each pixel of the image. Thus, in Equation 15, the Fourier transform of the probability, $p(T|f_j)$, is multiplied by the Fourier transform of the function representing the training data image, $f_j(u)$.

After the calculations of Equation 15 have been performed, the inverse Fast Fourier Transform of the result is calculated and can be applied to either incrementally update the prototype image as in $g_{update} = (1-\beta)g + \beta g_j$, or all partial updates can be accumulated and Equation 12 can be used to determine the outer sum over each training frame, j. Note that the summation can be done in the Fourier domain, thus avoiding applying the inverse Fourier transformations on each partial update.

By utilizing Equation 15 to perform the partial updates, the number of calculations needed to re-estimate the prototype image drops significantly. Specifically, without the use of the Fast Fourier Transform, an N-by-N image would require $N^4$ calculations for each frame of training data. However, using the Fast Fourier Transform, the number of required calculations drops to an order of $N^2 \log N$. This represents a significant drop in the number of calculations needed to train the prototype model.

While the above describes the simplest embodiment of the present invention, those skilled in the art will recognize that the described efficient method for dealing with all integer image shifts can be applied in more complex models, such as the ones with multiple image prototypes, or where noise variances are also learned. While in these cases the inference and update equations may involve other hidden variables, the translation variable will still be inferred through correlations computed in the FFT domain, while the parameters, such as the image prototype and variances, would be optimized efficiently using convolution of the translation posterior with appropriate terms in the FFT domain. Following the recipe in this document, those skilled in art can speed-up learning in any model that involves translations modeled as discrete hidden variables.

Figure 9:
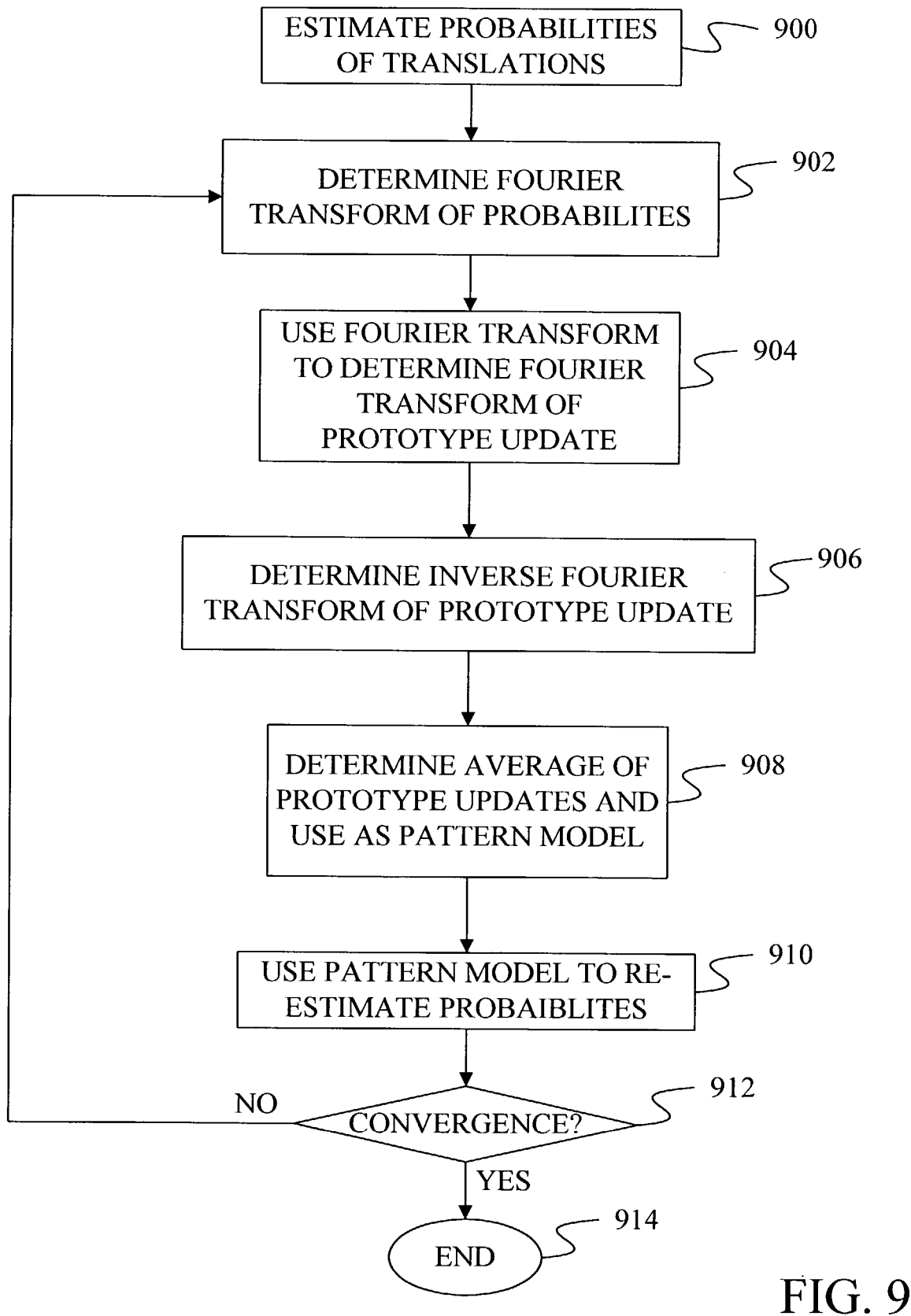
FIG. 9 is a flow diagram of a method of using inference to form a transformation-invariant model under one embodiment of the present invention.

Thus, a method of using inference to identify a transformation-invariant model can be summarized as found in the flow diagram of FIG. 9.

In step 900, an initial estimate of the probabilities of the translations is determined. This estimate can be as simple as making all translation values equally likely, or it can be based on a random or some other initialization of model parameters, such as image prototypes. In step 902, the Fourier transform of the probabilities is determined across all pixels on an image. The Fourier transform is then used in equation 15 to determine the Fourier transform of a prototype update at step 904.

At step 906, the inverse Fourier transform of the prototype update is determined. Each of a collection of prototype updates are then averaged together at step 908 to use as the image model. Depending on the probability model, it is possible to defer taking the inverse Fourier transform by performing summations directly in the Fourier domain whenever possible. At step 910, this image model is used to re-estimate the probabilities using equations 1, 9, 10, and 11 above.

At step 912, the probabilities are examined to determine if the translation model and the image model have converged on stable values. If they have not converged, the process returns to step 902 to determine the Fourier transforms for the new probability estimates. If the models have converged, the training process ends at step 914.

Although the invention has been described above with reference to using Fast Fourier Transform to reduce the number of computations associated with pattern recognition, those skilled in the art will recognize that the present invention is not limited to pattern recognition and may be used in any context in which a probability of a hidden variable is multiplied by a function that is a function of the hidden variable shifted by some amount.

Although the present invention has been described with reference to particular embodiments, workers skilled in the art will recognize that changes may be made in form and detail without departing from the spirit and scope of the invention.

What is claimed is:

1. A method comprising:
receiving a plurality of frames of training image data;
for each frame, a processor determining a set of probabilities, the set of probabilities comprising a separate probability for each of a set of possible translations of a pixel in the frame, each probability in the set of probabilities providing the probability of a translation of a pixel in the frame given the frame;
for each frame, determining a Fourier transform of the set of probabilities for the frame as $$\sum_T p(T \mid f_j) e^{-i\alpha\omega T}$$

where the summation is performed over all translations in the set of possible translations, T is a translation, $f_j$ is the frame, and $p(T|f_j)$ is the probability of translation T given frame $f_j$;
using the Fourier transform to determine a Fourier transform of an estimate of a prototype pattern;
determining the inverse Fourier transform of the Fourier transform of the estimate of the prototype pattern to form an estimate of the prototype pattern;
using the estimate of the prototype pattern to form an image model;
receiving test image data; and
using the image model to convert the test image data into an image identification.

2. The method of claim 1 wherein using the Fourier Transform to determine a Fourier Transform of an estimate of the prototype pattern comprises multiplying the Fourier Transform by a Fourier Transform of another function.

3. The method of claim 1 further comprising using the estimate of the prototype pattern to form a revised set of probabilities, each probability in the revised set of probabilities providing the probability of a translation of a pixel in the frame given the frame.

4. A computer program product embodied on a physical computer-readable medium and comprising code for causing a processor in a computer to perform steps comprising:
the processor determining a Fourier transform of a probability that is a function of a translation variable given a frame of image data, the translation variable representing shifting of a pixel of an image from one image location to another image location;
the processor determining a Fourier transform of a function;
the processor multiplying the Fourier transform of the probability by the Fourier transform of the function to produce a product;
the processor taking the inverse Fourier transform of the product to identify a set of values representing a prototype pattern that forms part of an image model.

5. The computer program product of claim 4 wherein the translation variable is a hidden variable.

6. The computer program product of claim 4 wherein the function provides values for pixels in a training image.

7. A method comprising:
determining a set of probabilities for a collection of possible translations of pixels in an image, each translation representing a shifting of a prototype image;
determining a Fourier transform of the set of probabilities;
using the Fourier transform to identify a prototype image for an image model, wherein using a Fourier transform to identify a prototype image comprises multiplying the Fourier transform by a value to produce a product and determining the inverse Fourier transform of the product;
storing the image model on a physical computer-readable medium;
receiving image data;
a processor retrieving the image model from the physical computer-readable medium and using the image model to identify an image from the image data.

8. The method of claim 7 wherein using the Fourier transform to identify a prototype image comprises determining a separate Fourier transform for each of a set of frames of training data, and using all of the Fourier transforms to identify the prototype image.

9. The method of claim 8 wherein using all of the Fourier transforms to identify a prototype image comprises:
multiplying each Fourier transform by a respective value to produce a respective product;
determining the inverse Fourier transform of each product to form a set of partial updates; and
finding the average of the partial updates.

10. A method comprising:
determining a probability for each value of a hidden variable to form a set of probabilities, the hidden variable representing a shift of pixels of a prototype image;
determining a Fourier Transform of the set of probabilities;
using the Fourier Transform to set an average of a prototype image as part of an image model, wherein using the Fourier Transform to set an average of a prototype image comprises multiplying the Fourier Transform by a Fourier Transform of another function to form a product and using the product to set the average;
storing the image model on a physical computer-readable medium;
receiving image data; and
retrieving the image model from the physical computer-readable medium and using the image model to produce an image identification from the image data.

11. The method of claim 10 wherein determining a probability for each value comprises determining a correlation using a Fourier Transform.

* * * * *